(12) United States Patent
Meinke

(10) Patent No.: US 6,364,392 B1
(45) Date of Patent: Apr. 2, 2002

(54) TAILGATE EXTENDER

(75) Inventor: Joseph S. Meinke, Gowen, MI (US)

(73) Assignee: ADAC Plastics, Inc., Grand Rapids, MI (US)

( * ) Notice: Subject to any disclaimer, the term of this patent is extended or adjusted under 35 U.S.C. 154(b) by 0 days.

(21) Appl. No.: 09/750,654

(22) Filed: Dec. 28, 2000

(51) Int. Cl.$^7$ .............................. B60P 7/15; B62D 33/03
(52) U.S. Cl. ...................... 296/62; 296/26.1; 296/57.1
(58) Field of Search .......................... 296/50, 57.1, 62, 296/26.01, 26.08, 26.09, 26.1; 280/163, 166

(56) References Cited

U.S. PATENT DOCUMENTS

| | | | |
|---|---|---|---|
| 4,021,071 A | * 5/1977 | Norman | 296/62 |
| 4,139,078 A | * 2/1979 | Keller | 182/88 |
| 4,531,773 A | * 7/1985 | Smith | 296/26.11 |
| 4,639,032 A | 1/1987 | Barbour | 296/62 |
| 4,846,487 A | 7/1989 | Criley | 280/166 |
| 5,028,063 A | 7/1991 | Andrews | 280/166 |
| 5,468,038 A | * 11/1995 | Sauri | 296/57.1 |
| 5,478,130 A | * 12/1995 | Matulin et al. | 296/57.1 |
| 5,658,033 A | * 8/1997 | Delaune | 296/26.08 |
| 5,732,995 A | 3/1998 | Piccariello | 296/57.1 |
| 5,732,996 A | 3/1998 | Graffy et al. | 296/62 |
| 5,788,311 A | * 8/1998 | Tibbals | 296/62 |
| 5,803,523 A | 9/1998 | Clark et al. | 296/26.1 |
| 5,820,193 A | 10/1998 | Straffon | 296/62 |
| 6,045,172 A | * 4/2000 | Thomas et al. | 296/26.1 |
| 6,082,801 A | * 7/2000 | Owen et al. | 296/26.11 |
| 6,120,076 A | * 9/2000 | Adsit et al. | 296/26.11 |
| 6,142,548 A | * 11/2000 | Kuhn et al. | 296/26.1 |

FOREIGN PATENT DOCUMENTS

FR 1239687 * 7/1960 ................. 296/26.1

* cited by examiner

Primary Examiner—Joseph D. Pape
Assistant Examiner—Paul Chenevert
(74) Attorney, Agent, or Firm—Young & Basile, P.C.

(57) ABSTRACT

A tailgate assembly for use with a motor vehicle of the type including a cab and a cargo body positioned rearwardly of the cab and including side walls and a floor coacting at the rear of the cargo body to define a tailgate opening into which the tailgate is fitted. The tailgate assembly includes an extender assembly including a bar positioned proximate an upper edge of the tailgate and a pair of post assemblies extending downwardly from the bar into the tailgate proximate respective side edges of the tailgate. Each post assembly includes a lower post member articulated to an upper post member which in turn is connected to the bar. The bar may be raised to a position above the upper edge of the tailgate by sliding the post assemblies upwardly within guide tubes provided in the tailgate whereby to provide further vertical restraint for loads carried by the vehicle. If the bar is moved upwardly to a position wherein the axis of articulation between the upper and lower post members is positioned above the upper edge of the tailgate, the bar together with the upper post members may be rotated about the axis of articulation to move the extender assembly to positions at right angles to the plane of the tailgate where it may provide further load restraint with the tailgate lowered or may provide a step to facilitate entry into the cargo body of the vehicle.

15 Claims, 6 Drawing Sheets

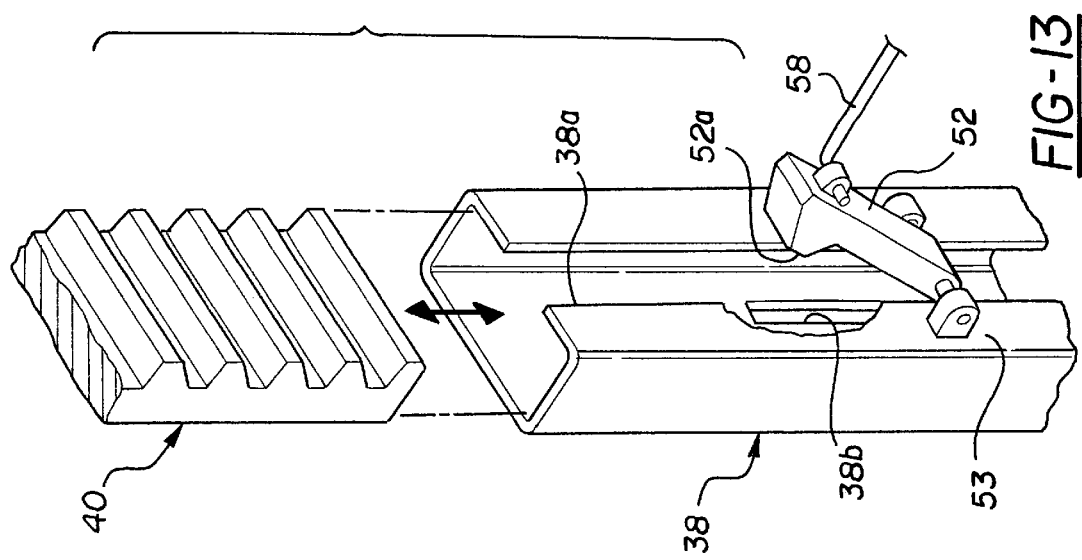
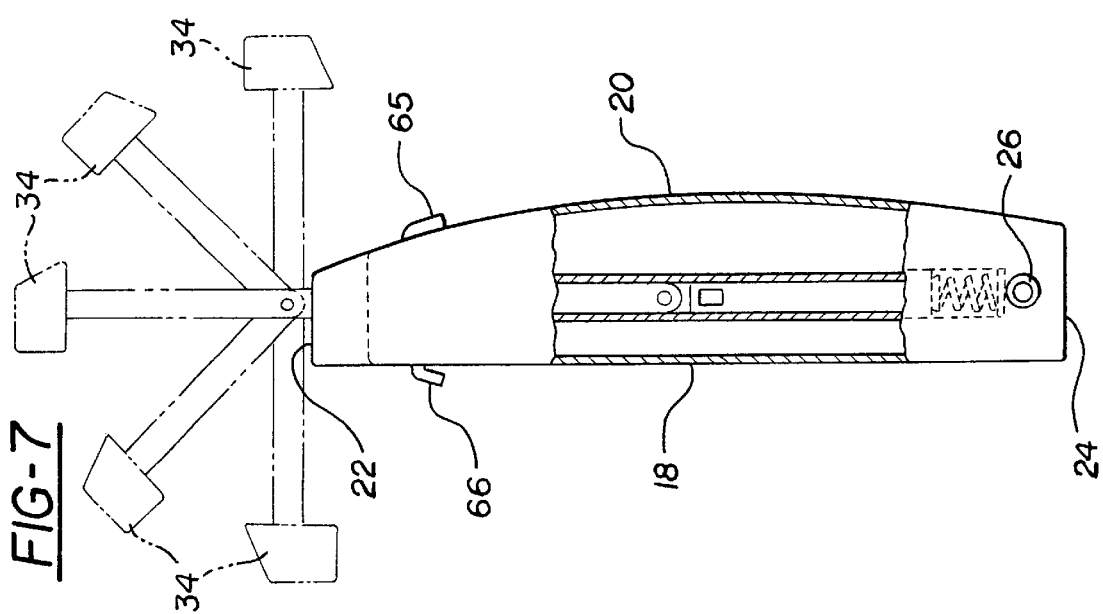
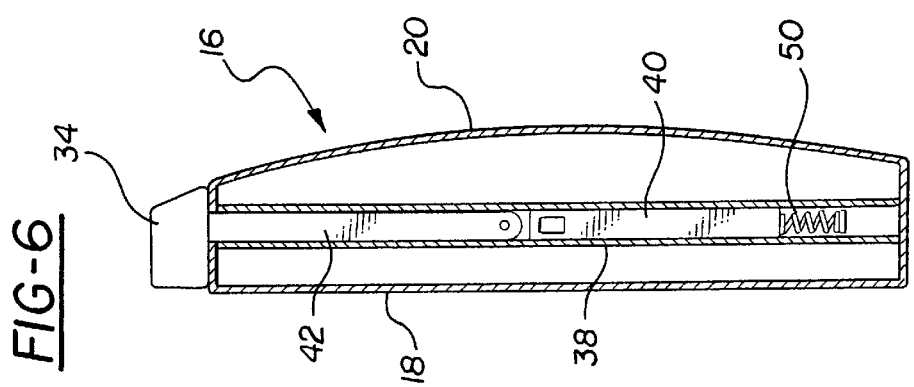

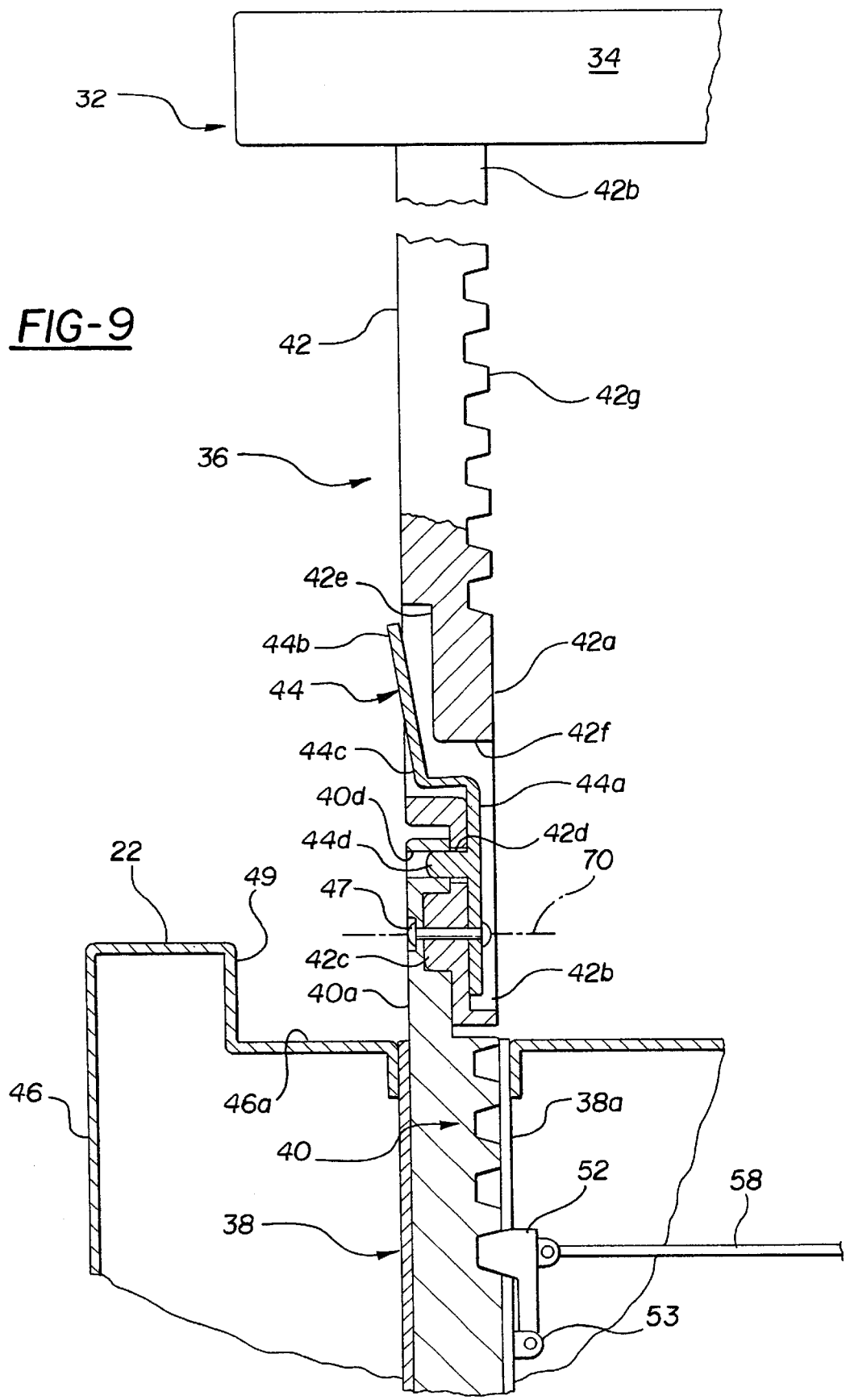

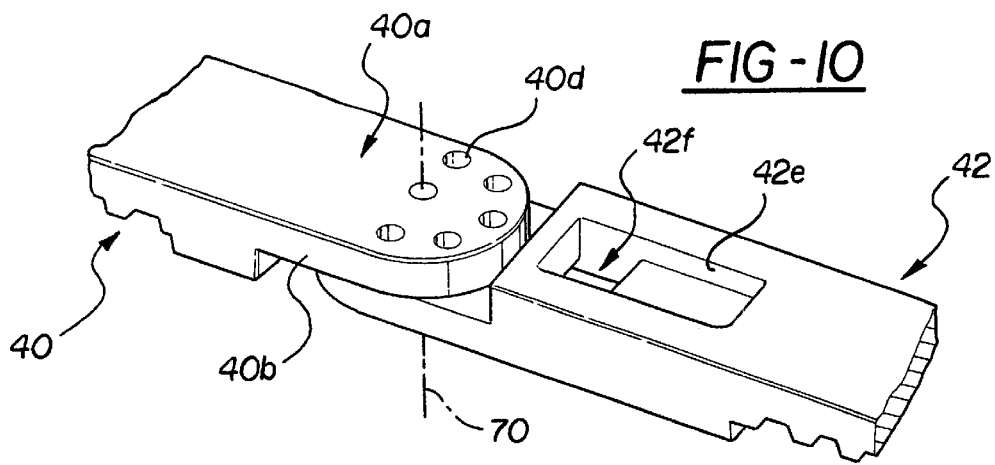
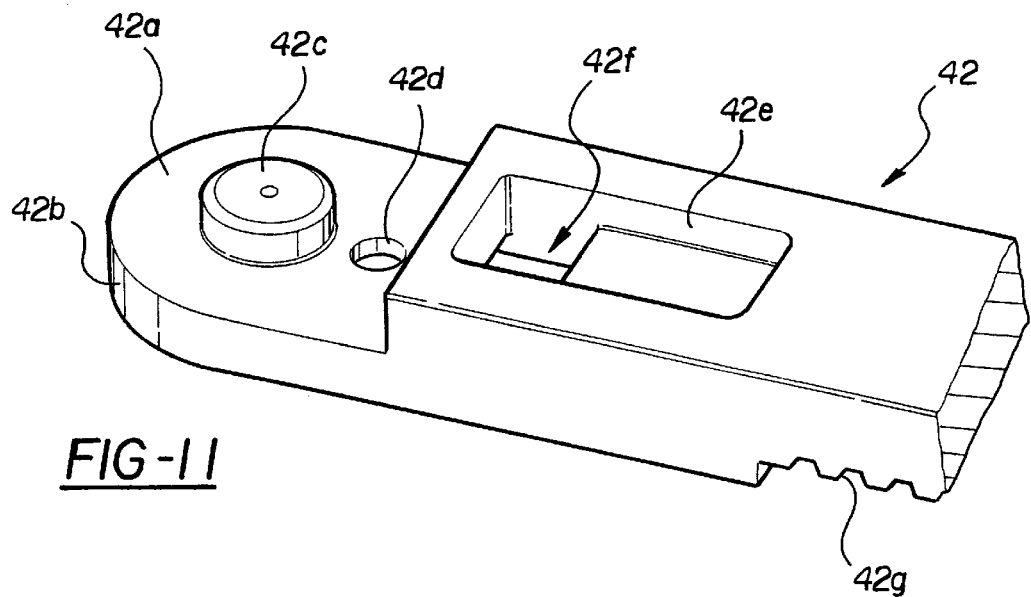
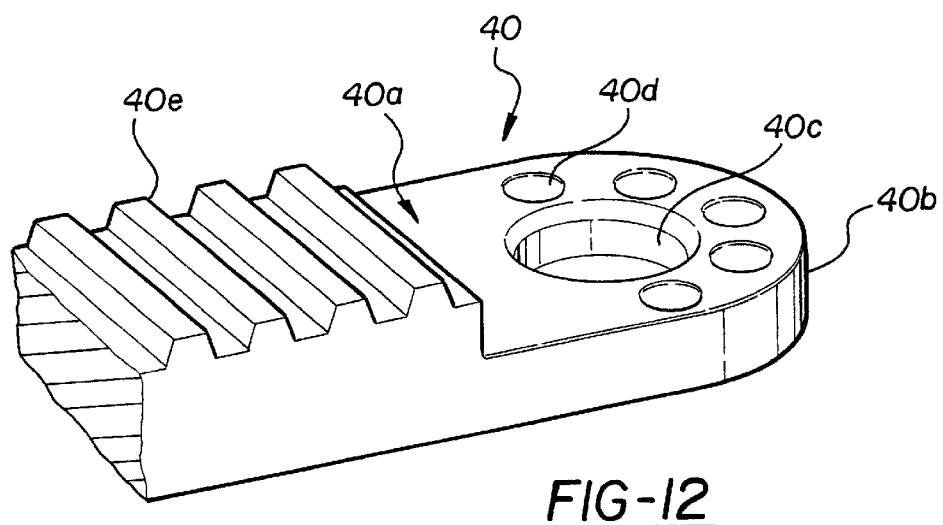

TAILGATE EXTENDER

FIELD OF THE INVENTION

This invention relates to gates for motor vehicles and more particularly to a tailgate for pickup type motor vehicles.

BACKGROUND OF THE INVENTION

Motor vehicles of the pickup type are in common usage and typically include a cab and a cargo body positioned rearwardly of the cab and including side walls and a floor coacting at the rear of the cargo body to define a tailgate opening. A tailgate is positioned in the opening and is typically pivotally mounted between a raised position in which the tailgate closes the opening and a lowered position in which the tailgate extends rearwardly of the cargo body as an extension of the cargo body floor. Whereas pickup tailgates of this type are extremely useful, there are usage situations in which the tailgate does not provide adequate load support and/or load restraint.

SUMMARY OF THE INVENTION

This invention is directed to an improved tailgate assembly for a motor vehicle of the pickup type.

More specifically, this invention is directed to a tailgate assembly in which the tailgate may be readily extended to provide supplemental load support and/or load restraint.

Yet more specifically, this invention is directed to a tailgate assembly in which the tailgate extension may selectively assume various postures to selectively address various load requirements.

The tailgate assembly is for use with a motor vehicle of the type including a cab and a cargo body positioned rearwardly of the cab and including side walls and a floor coacting at the rear of the cargo body to define a tailgate opening. A generally planar tailgate having a width approximating the width of the tailgate opening is fitted in and closes the tailgate opening and means are provided for mounting the tailgate on the cargo body for pivotal movement between a raised position in which the tailgate closes the opening and a lowered position in which the tailgate extends rearwardly of the cargo body as an extension of the cargo body floor. The tailgate assembly further includes latch means for coaction with latch means on the cargo body to maintain the tailgate in its raised position.

According to the invention, the tailgate assembly further includes an extender assembly including a bar having a length approximating the width of the tailgate and movable between a stowed position proximate and substantially coextensive with an upper edge of the tailgate, an extended position positioned above the upper edge of the tailgate and in the general plane of the tailgate, and a displaced position in which it is removed from the plane of the tailgate, and catch means are provided which are selectively operable to fixedly but releasably secure the bar in its stowed position, in its raised position, and in its displaced position. This arrangement allows the tailgate to be selectively extended in a manner to selectively address various unique load requirements of the vehicle.

According to a further feature of the invention, the movement of the bar from the stowed position to the extended position comprises a sliding movement in the plane of the tailgate, and the movement of the bar from the extended position to the displaced position comprises a rotary movement. This arrangement allows the extender to be moved quickly and efficiently between its various positions.

According to a further feature of the invention, the extender assembly further includes a pair of vertical post assemblies connected at their upper ends to spaced points on the bar proximate respective ends of the bar and mounted for vertical sliding movement in the tailgate to move the bar from its stowed to its extended position. This arrangement facilitates the movement of the tailgate from its stowed to its extended position.

According to a further feature of the invention, each post assembly includes a lower post member articulated to an upper post member connected to the bar, and the axis of articulation is positioned above the upper edge of the tailgate with the bar in its extended position. This arrangement allows the bar to be moved from its extended position to its displaced position by pivotal movement of the upper post members and the bar about the axis of articulation.

According to a further feature of the invention, the displaced position comprises a lowered position relative to the tailgate with the tailgate in its open position, whereby to provide a step to facilitate entry into the cargo body, the bar is further movable to a raised position relative to the tailgate with the tailgate in its open position, whereby to provide a barrier to contain cargo positioned on the floor of the cargo body, and the catch means is further operable to fixedly but releasably secure the bar in the raised position. This arrangement allows the extender assembly to further function as a step to facilitate entry into the cargo body.

According to a further feature of the invention, the bar is further movable to positions intermediate the extended position and the raised position and intermediate the extended position and the lowered position, and the catch means is further operable to fixedly but releasably secure the bar in the intermediate positions. This arrangement allows the bar to assume a plurality of selected positions between the primary position whereby to selectively address unique loading requirements.

Other objects, advantages and applications of the present invention will become apparent to those skilled in the art when the following description of the best mode contemplated for practicing the invention is read in conjunction with the accompanying drawings.

BRIEF DESCRIPTION OF THE DRAWINGS

The description herein makes reference to the accompanying drawings wherein like reference numerals refer to like parts throughout the several views, and wherein:

FIGS. 6 and 7 are cross-sectional somewhat schematic views of the tailgate assembly;

FIG. 9 is a fragmentary view showing details of an extender assembly utilized in the tailgate assembly;

FIG. 10 is a perspective fragmentary view of a portion of the extender assembly;

FIGS. 11 and 12 are perspective detail views of elements of the extender assembly; and FIG. 13 is a fragmentary exploded view of a further portion of the extender assembly.

DESCRIPTION OF THE PREFERRED EMBODIMENT

Figure 1:
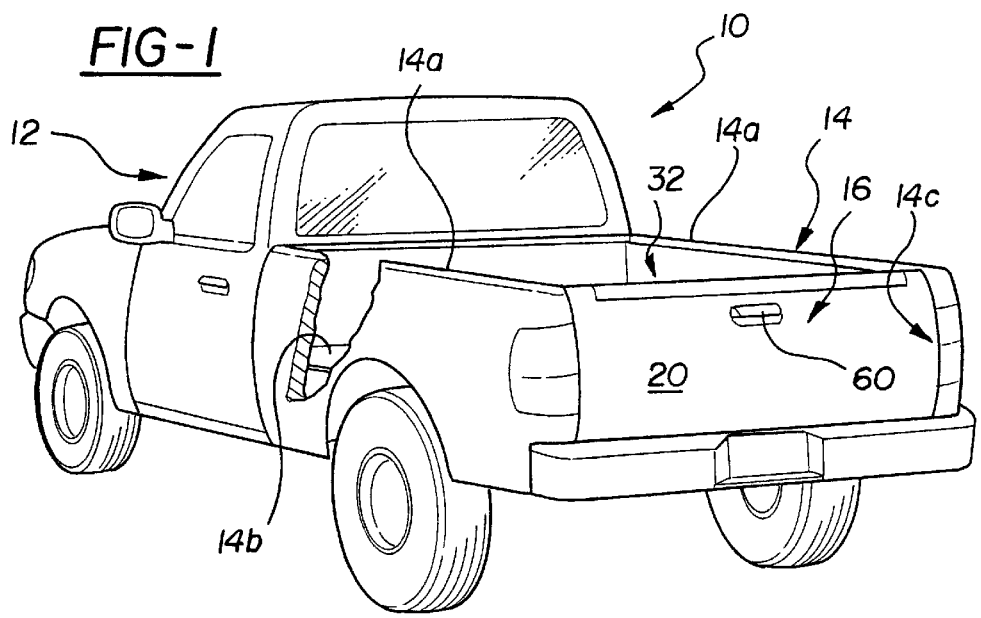
FIG. 1 is a perspective fragmentary view of a motor vehicle of the pickup type and including a tailgate assembly shown in a raised position.

The motor vehicle 10 seen fragmentarily in FIG. 1 is of the pickup type and includes a cab 12, a cargo body 14 positioned rearwardly of the cab, and a tailgate assembly 16.

Cargo body 14 includes sides 14a and a floor 14b coacting at the rear of the cargo body to define a tailgate opening 14c.

Tailgate assembly 16 (FIGS. 2, 6, 7, and 8) has a generally planar, hollow, box-like configuration including an inner panel 18, an outer or rear panel 20, an upper edge wall 22, and a lower edge wall 24. Pivot means 26 of known form are provided proximate the lower edge of the tailgate to mount the tailgate on the cargo body for pivotal movement between a raised position in which the tailgate closes the opening 14c of the cargo body and a lowered position in which the tailgate extends rearwardly of the cargo body as an extension of the cargo body floor 14b. The tailgate assembly further includes latch means 28 of known form for coaction with latch means 30 on the cargo body to maintain the tailgate in its raised position.

The tailgate assembly further includes an extender assembly 32 for selectively extending and varying the load carrying and/or retaining capacity of the tailgate. Extender assembly 32 includes a bar 34 having a length approximating the width of the tailgate, and a pair of vertical post assemblies 36 connected at their upper ends to spaced points on the bar proximate respective ends of the bar and mounted for vertical sliding movement in the tailgate to move the bar between a stowed position proximate and substantially coextensive with the upper edge wall 22 of the tailgate and an extended position positioned above the upper edge wall of the tailgate and in the general plane of the tailgate.

Each post assembly 36 includes (see also FIGS. 9–13) a fixed tube 38, a lower post member 40 slidably mounted in the tube, and an upper post member 42 articulated at a lower end 42a thereof to an upper end 40a of the lower post member and connected at its upper end 42h to bar 34.

The guide tubes 38 of the post assemblies are fixedly positioned in vertical fashion within the tailgate in laterally spaced relation and in general proximity to the respective side edge walls 46, 48 of the tailgate.

Each lower post member 40 is slidably and telescopically positioned within the respective guide tube 38. The upper end 40a of each lower post member 40 includes a flat semi-circular mounting portion 40b defining a central socket 40c and a plurality of circumferentially spaced catch holes 40d centered on the socket 40c. Each lower post member further includes a plurality of vertically spaced rack teeth 40e formed in the inboard face of the member below upper end 40a.

The lower end 42a of each upper post member 42 includes a flat semicircular portion 42b defining a central journal or post 42c and a catch hole 42d. The lower end 42a of each upper post member further defines a recess 42e communicating with a through passage 42f. A flexible spring steel button plate 44 is associated with the lower end 42a of each upper post member and specifically includes a mounting portion 44a fixedly secured to the flat semicircular portion 42b in underlying relation to post 42c, an access or button portion 44b positioned in overlying relation to recess 42e, a bridge portion 44c positioned in passage 42f and interconnecting portions 44a and 44b, and a catch pin portion 44d projecting outwardly from mounting portion 44a. Each upper post member further includes a plurality of vertically spaced rack teeth 42g formed in the inboard face of the member above lower end 42a.

In the assembled relation of the upper and lower post members, post 42c is journaled in socket 40c, pin 44d projects through catch hole 42d for engagement with a selected one of the circumferentially spaced series of catch holes 40d whereby to position the upper post member in a selected angular relationship with respect to the lower post member, and a pivot pin 47 maintains the upper and lower post members in assembled, articulated relation.

With the extender assembly 32 in its lowered or stowed position proximate the upper edge wall 22 of the tailgate, each upper post member is positioned in linear alignment with the respective lower post member and the bar 34 is nestled in a notch 49 formed in the upper edge wall 22 of the tailgate with the upper face 34a of the bar substantially flush with the tailgate upper edge wall 22 and with each post assembly 36 slidably and telescopically positioned in a respective guide tube 38.

A spring 50 positioned in the lower end of each guide tube 38 in engagement with the lower end 40f of a respective lower post member 40 urges the respective post assembly upwardly within the guide tube. Each post assembly is normally precluded from upward movement under the urging of the respective spring 50 by a catch dog 52 engaging a respective tooth 42g. Specifically, each catch dog 52 is pivotally mounted on a hinge plate 53 secured to the respective guide tube and includes a tooth 52a passing through a vertical slot 38a in a respective guide tube 38 for engagement with a respective tooth 42g on the inboard face of the upper post member 42 whereby to preclude upward movement of the respective post assembly within the guide tube unless and until the catch dogs 52 are withdrawn from the respective teeth 42g to allow upward movement of the respective post assembly under the urging of the respective spring 50.

Catch dogs 52 may be controlled, for example, via a central lever 54 pivotally mounted on pivot axis 56 proximate the inner panel 18 of the tailgate and connected at its opposite ends to the respective dogs 52 via links 58. A handle 60 mounted on the outer panel 20 of the door on pivot axis 56 is operative when turned to control the dogs 52 and selectively allow upward and downward movement of the post assemblies. Specifically, clockwise movement of the handle as viewed in FIG. 8 operates via link 54 to pivot the dogs 52 in a direction to disengage the teeth 52a from the respective teeth 42g and release the extender assembly for upward movement under the urging of springs 50, and counterclockwise movement of handle 60 as viewed in FIG. 8 urges the dogs 52 to pivot in a direction to re-engage respective teeth 42g so as to interrupt the movement of the post assemblies and maintain the instantaneous position of the extender assembly.

Handle 60 further desirably controls a further link 62 connected at its opposite ends via links 64 to latch mechanisms 28 so that handle 60 may also be utilized to latch and unlatch the latch mechanisms 28 and selectively allow pivotal movement of the tailgate from its raised, latched position to its lowered position. A suitable coupling mechanism (not shown) allows the handle 60 to selectively coact with lever 54 without coacting with lever 62, whereby to control the extender assembly without disturbing the latched condition of the tailgate, and conversely to control lever 62 without disturbing lever 54, whereby to select the latched/unlatched disposition of the tailgate without affecting the operation of the extender assembly.

Alternatively, separate handles may be provided for the latch mechanisms and the extension assembly. Specifically, and as seen schematically in FIG. 7, a handle 65 for the latch mechanisms may be provided in the outer panel 20 of the tailgate and a separate handle 66 for the extension assembly may be provided in the inner panel 18 of the tailgate.

Stop members 68 provided on the outboard face of the lower end 40f the respective lower posts 40 guide in slots 38b in the respective tubular guides 38 to provide a stop arrangement to limit the upward movement of the post assemblies within the tubular guides.

OPERATION

The normal disposition of the tailgate is seen in FIG. 1 wherein the tailgate is in its raised, latched position and the extender is in its stowed position. In this disposition, bar 34 of the extender assembly is positioned within notch 49 in the upper edge of the tailgate; the upper and lower post members of each post assembly are arranged in a linearly aligned disposition relative to each other; each post assembly is totally telescopically received within the respective guide tube 38; and each post assembly 32 is held in its telescopically disposed disposition within the respective guide tube by engagement of a catch dog 52 with an upper tooth 42g in the inboard face of the upper post member 42 whereby to resist upward movement of the post assemblies within the guide tubes against the urging of the compressed springs 50.

If it is desired to raise the extender assembly with respect to the tailgate to provide additional vertical load restraint for cargo carried within the cargo body of the vehicle, handle 60 may be rotated in a clockwise direction to withdraw catch dogs 52 from engagement with teeth 42g and allow the extender assembly to slide upwardly within the guide tubes under the urgings of the springs 50. The extender may be allowed to move upwardly a small amount, whereafter the handle 60 may be rotated to allow the catch dogs 52 to engage a lower tooth 42g on the upper post or, more typically, the extender assembly may be allowed to move up to its fully extended position seen in FIG. 9 in which the axis of articulation 70 between the upper and lower post members of each post assembly is positioned above the upper edge 46a of the notch 49 whereafter the handle may be rotated to allow the dogs 52 to engage a tooth 40e on the inboard face of the lower post members. This fully upwardly extended position is also defined by engagement of the stop members 68 on the lower post members with the upper ends of the slots 38b in the respective guide post 38.

Figure 2:
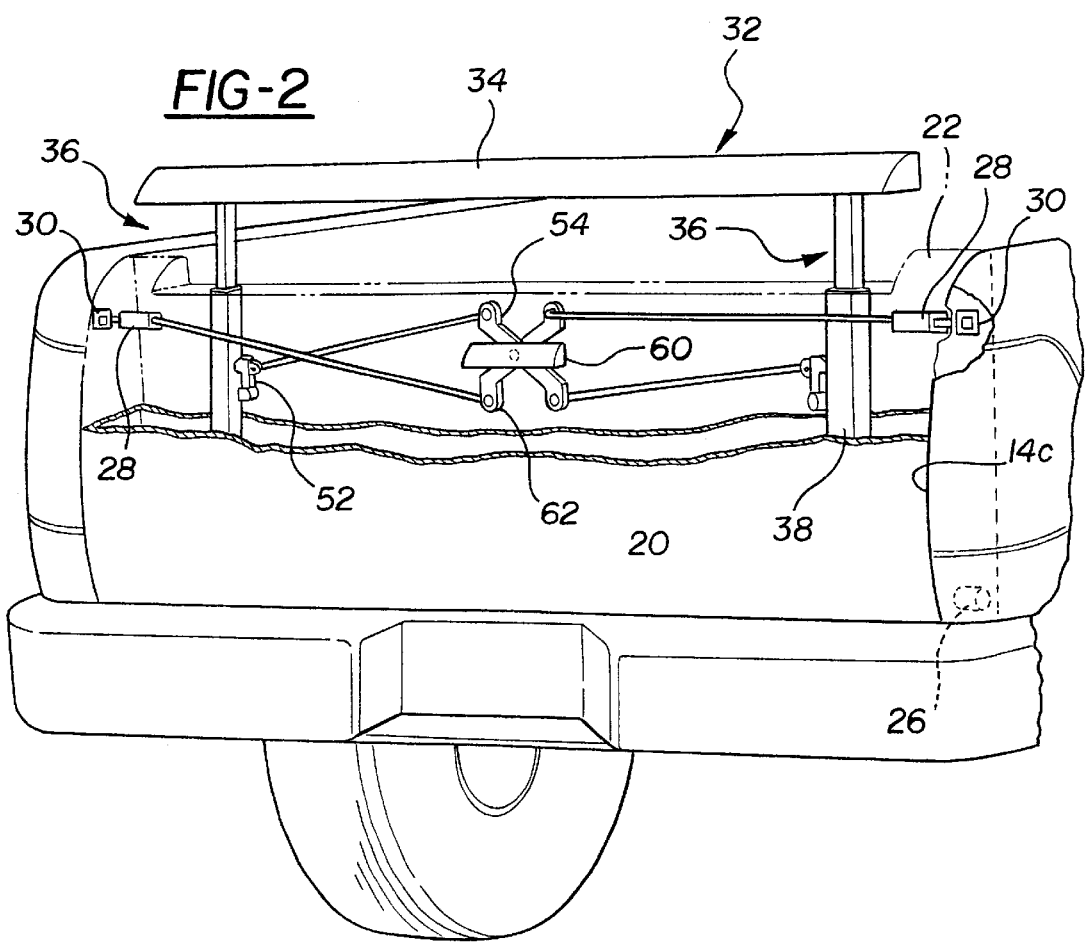
FIG. 2 is a fragmentary view of the tailgate assembly in a raised position.
Figure 3:
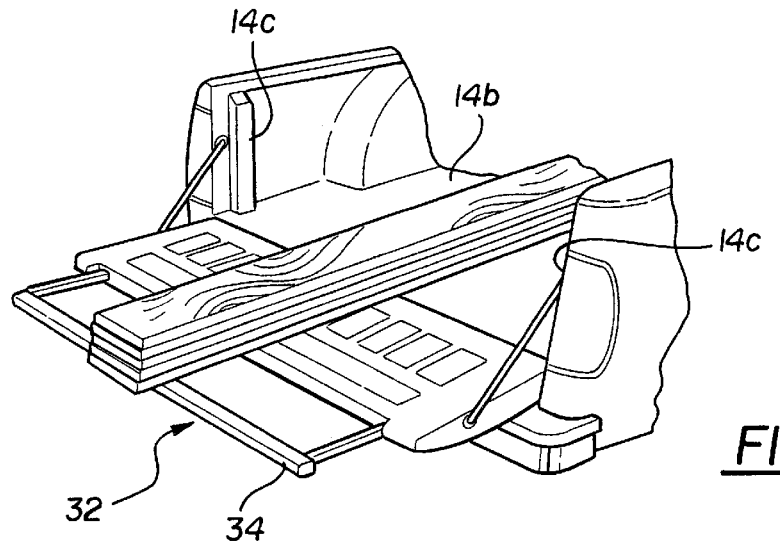
FIGS. 3, 4, and 5 are fragmentary views showing the tailgate assembly in a lowered position and configured to address varying load requirements.

In this extended position, and as seen in FIG. 2, the extender assembly provides additional vertical restraint for cargo within the cargo bed of the vehicle. The tailgate assembly with the extender assembly extended may now be lowered to the lowered tailgate position seen in FIG. 3 in which the extender assembly provides additional length for the floor support surface of the cargo body whereby to accommodate elongated elements such as the stacked lumber seen in FIG. 3. Of course, the extender assembly may be moved to its extended position after the tailgate has been moved to its lowered position rather than prior to the movement of the tailgate to its lowered position.

With the tailgate in its extended position to position the axis of articulation 70 above the upper edge of the tailgate, the upper post members of the post assemblies may be selectively rotated relative to the lower post members to displace the extender assembly from the plane of the tailgate and thereby provide further and selected extender dispositions.

Figure 4:
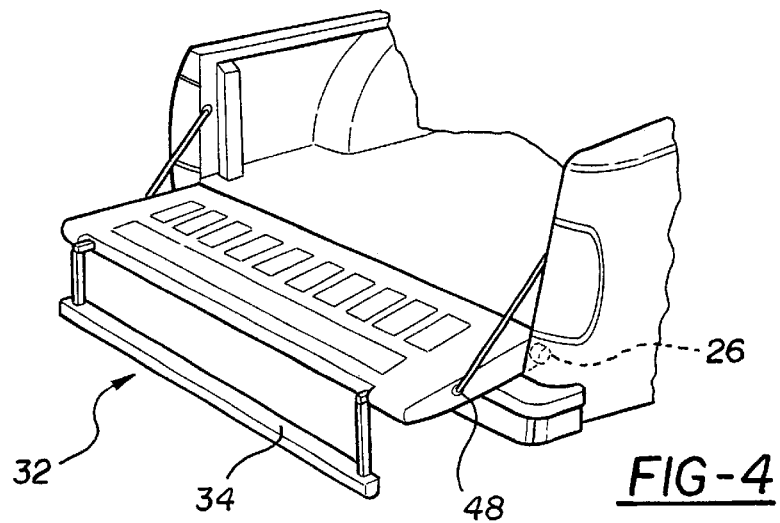
Figure 5:
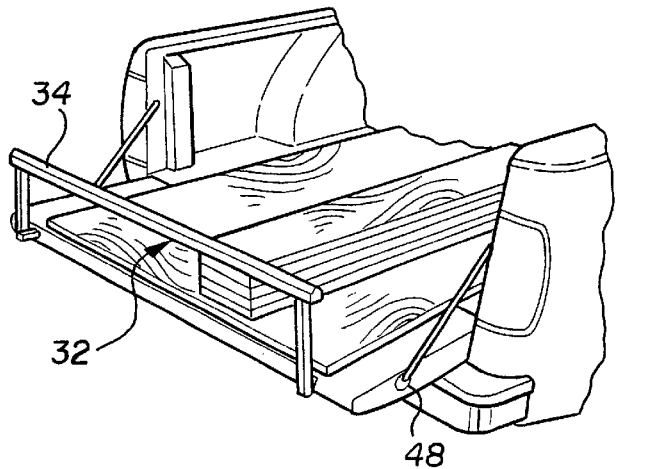
Figure 8:
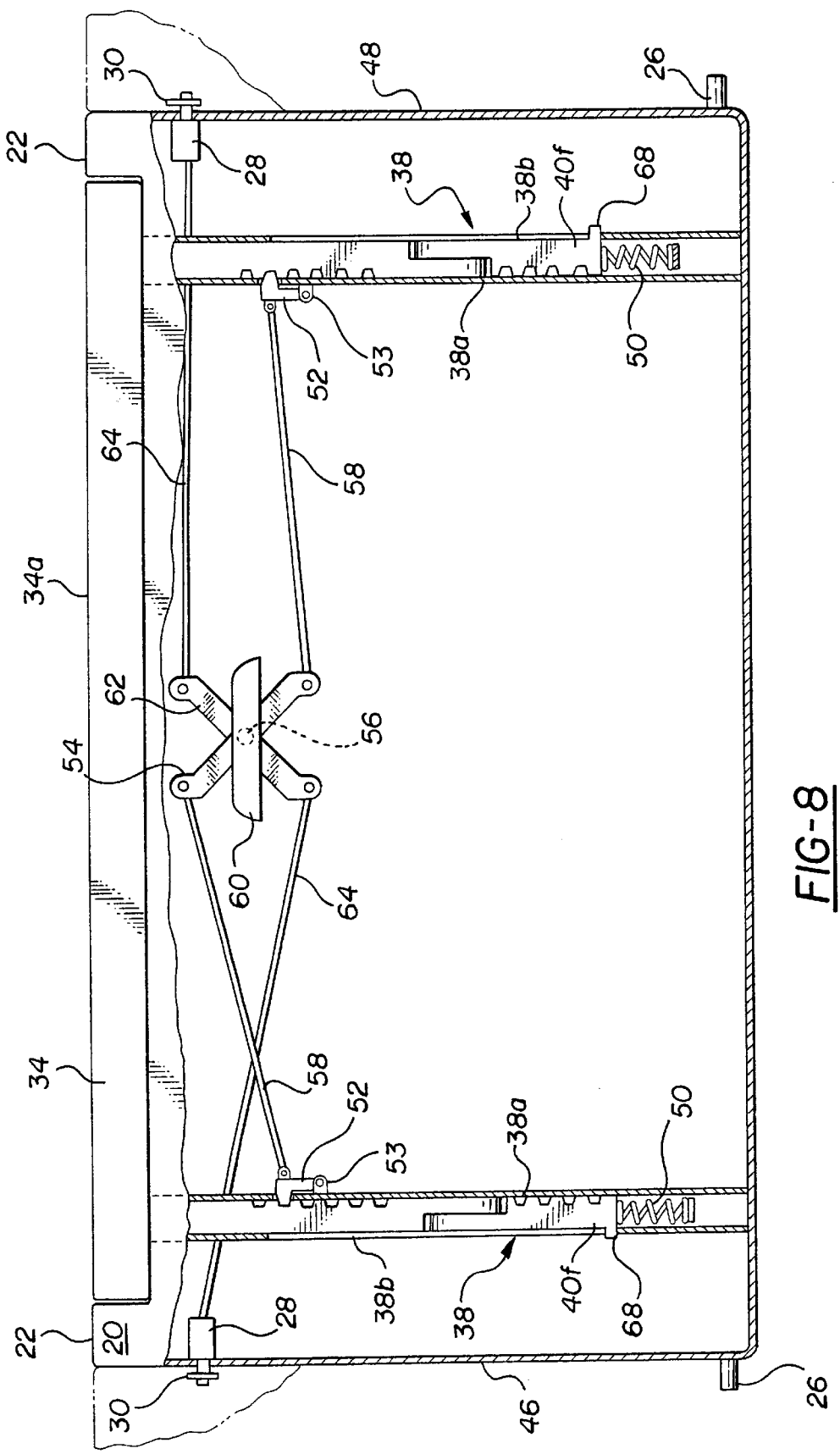
FIG. 8 is a somewhat schematic view of the tailgate assembly looking rearwardly from inside the cargo body of the motor vehicle with the inner tailgate panel broken away for purposes of clarity.

Specifically, the buttons 44b on the post assemblies may be pressed inwardly to remove the catch pins 44d from the engaged catch holes 40d whereafter the upper post members may be rotated relative to the lower post members about the axis of articulation 70 to a variety of selected angular dispositions relative to the lower post members whereafter the buttons 44b may be released to allow the catch pins 44d to enter and coact with other selected catch holes 40d. For example, and considering the tailgate in the lowered position, the upper post members may be rotated downwardly to position the bar 34 below the rear edge of the tailgate assembly or, alternatively, the upper post members may be rotated upwardly relative to the tailgate to position the bar 34 above the rear edge of the lowered tailgate. With the upper post members rotated downwardly, and as seen in FIG. 4, the bar 34 provides a convenient step to facilitate entry into the cargo body. With the upper post rotated upwardly as seen in FIG. 5, the extender assembly provides a stop to limit and constrain the movement of cargo positioned on the floor of the cargo body.

As seen in FIG. 7, the upper post may also be rotated relative to the lower post to intermediate positions as defined by the intermediate catch holes 40d.

When it is desired to return the extender assembly to its stowed disposition relative to the tailgate, the upper posts are moved to a position in which the upper posts are in linear alignment with the lower posts whereafter handle 60 is rotated to release the catch dogs 52 from engagement with the teeth 40e on the lower posts and the bar 34 is pushed downwardly to move the extender assembly downwardly into the tailgate against the resistance of the springs 50 until the stowed disposition is achieved whereafter the handle 60 may be turned to allow the catch dogs to engage a tooth 42g on the upper post members. The stowed position of the extender assembly is further defined by engagement of the lower face of the bar 34 with the upper face 46a of the notch 49. The movement of the extender assembly between its stowed and extended positions may be readily achieved with the tailgate either in its raised, latched position or in its lowered position.

The tailgate assembly of the invention will be seen to provide an arrangement whereby the tailgate can be readily configured to accommodate various load constraint requirements and can further be readily configured to provide a step to facilitate entry into the cargo body of the vehicle.

While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. A tailgate assembly for use with a motor vehicle of the type including a cab and a cargo body positioned rearwardly of the cab and including side walls and a floor coacting at the rear of the cargo body to define a tailgate opening, the tailgate assembly comprising:

a generally planar tailgate having a width approximating the width of the tailgate opening whereby to fit in and close the tailgate opening;

means for mounting the tailgate on the cargo body for pivotal movement between a raised position in which the tailgate closes the opening and a lowered position in which the tailgate extends rearwardly of the cargo body as an extension of the cargo body floor;

latch means for coaction with latch means on the cargo body to maintain the tailgate in its raised position;

an extender assembly including a bar having a length approximating the width of the tailgate, the bar being movable between a stowed position proximate and substantially coextensive with an upper edge of the tailgate, an extended position positioned above the upper edge of the tailgate and in the general plane of the tailgate, and a displaced position in which it is removed from the plane of the tailgate;

multiple operating catch means selectively operable to fixedly but releasably secure the bar in its stowed position, in its extended position, and in its displaced position;

the movement of the bar from the stowed position to the extended position comprising a sliding movement in the plane of the tailgate;

the movement of the bar from the extended position to the displaced position comprising a rotary movement;

the extender assembly further including a pair of vertical post assemblies connected at their upper ends to spaced points on the bar proximate respective ends of the bar and mounted for vertical sliding movement in the tailgate to move the bar from its stowed to its extended position;

each post assembly including a lower post member articulated to an upper post member connected to the bar; and the axis of articulation being positioned above the upper edge of the tailgate with the bar in its extended position, whereby to allow the bar to be moved from its extended position to its displaced position by pivotal movement of the upper post member and the bar about the axis of articulation.

2. A tailgate assembly according to claim 1 wherein:

each post assembly further includes a vertical guide tube mounted in the tailgate; and each lower post member is slidably mounted in the respective guide tube.

3. A tailgate assembly according to claim 2 wherein the multiple operating catch means include coat catch structures on each guide tube and a respective post member.

4. A tailgate assembly according to claim 3 wherein the multiple operating catch means further include coacting catch devices on each post assembly proximate the axis of articulation.

5. A tailgate for use with a motor vehicle of the type including a cab and a cargo body positioned rearwardly of the cab and including side walls and a floor coacting at the rear of the cargo body to define a tailgate opening, the tailgate assembly comprising:

a generally planar tailgate having a width approximating the width of the tailgate opening whereby to fit in and close the tailgate opening;

means for mounting the tailgate on the cargo body for pivotal movement between a raised position in which the tailgate closes the opening and a lowered position in which the tailgate extends rearwardly of the cargo body as an extension of the cargo body floor;

latch means for coaction with latch means on the cargo body to maintain the tailgate in its raised position;

an extender assembly including a bar having a length approximating the width of the tailgate, the bar being movable between a stowed position proximate and substantially coextensive with an upper edge of the tailgate, an extended position positioned above the upper edge of the tailgate and in the general plane of the tailgate, and a displaced position in which it is removed from the plane of the tailgate; and multiple operating catch means selectively operable to fixedly but releasably secure the bar in its stowed position, in its extended position, and in its displaced position;

the movement of the bar from the stowed position to the extended position comprising a sliding movement in the plane of the tailgate;

the movement of the bar from the extended position to the displaced position comprising a rotary movement;

the extender assembly further including a pair of vertical post assemblies connected at their upper ends to spaced points on the bar proximate respective ends of the bar and mounted for vertical sliding movement in the tailgate to move the bar from its stowed to its extended position;

each post assembly including a lower post member articulated to an upper post member connected to the bar;

the axis of articulation being positioned above the upper edge of the tailgate with the bar in its extended position, whereby to allow the bar to be moved from its extended position to its displaced position by pivotal movement of the upper post member and the bar about the axis of articulation;

the displaced position comprising a lowered position relative to the tailgate with the tailgate in its open position, whereby to provide a step to facilitate entry into the cargo body;

the bar being further movable to a raised position relative to the tailgate with the tailgate in its open position, whereby to provide a barrier to contain cargo positioned on the floor of the cargo body; and the multiple operating catch means being further operable to fixedly but releasably secure the bar in the lowered or raised position.

6. A tailgate assembly according to claim 5 wherein:

the bar is further movable to positions intermediate the raised position and the extended position and intermediate the extended position and the lowered position; and the multiple operating catch means is further operable to fixedly but releasably secure the bar in the intermediate positions.

7. A tailgate assembly for use with a motor vehicle of the type including a cab and a cargo body positioned rearwardly of the cab and including side walls and a floor coacting at the rear of the cargo body to define a tailgate opening, the tailgate assembly comprising:

a generally planar tailgate having a size and configuration to fit the tailgate opening;

means for mounting the tailgate on the cargo body for pivotal movement between a raised position in which the tailgate closes the opening and a lowered position in which the tailgate extends rearwardly of the cargo body as an extension of the cargo body floor;

latch means for coaction with latch means on the cargo body to maintain the tailgate in its raised position;

an extender assembly including a bar movable between a stowed position proximate an upper edge of the tailgate and an extended position positioned above the upper edge of the tailgate;

catch means selectively operable to fixedly but releasably secure the bar in its stowed and in its extended position;

spring means biasing the bar for movement from the stowed position to the extended position and yieldably resisting movement of the bar from the extended position to the stowed position; and release means operative to release the catch means securing the bar in the stowed position to allow the bar to move under the urging of the spring means to the extended position.

8. A tailgate assembly according to claim 7 wherein:

the release means includes a handle positioned on the tailgate; and the handle is further operative to release the tailgate latch means from the cargo body latch means to allow movement of the tailgate from its raised position to its lowered position.

9. A tailgate assembly according to claim 8 wherein movement of the handle in a first direction releases the extender assembly catch means and movement of the handle in a second direction releases the tailgate latch means.

10. A tailgate assembly according to claim 7 wherein:

the extended position of the bar is in the general plane of the tailgate; and the bar is further movable to a displaced position in which it is removed from the plane of the tailgate.

11. A tailgate assembly according to claim 10 wherein:

the movement of the bar from the stowed position to the extended position comprises a sliding movement in the plane of the tailgate; and the movement of the bar from the extended position to the displaced position comprises a rotary movement.

12. A tailgate assembly according to claim 1 wherein the extender assembly further comprises a pair of vertical post assemblies connected at their upper ends to spaced points on the bar proximate respective ends of the bar and mounted for sliding movement in the tailgate to move the bar from its stowed to its extended position.

13. A tailgate assembly according to claim 12 wherein:

each post assembly includes a lower post member articulated to an upper post member connected to the bar; and the axis of articulation is positioned above the upper edge of the tailgate with the bar in its extended position, whereby to allow the bar to be moved from its extended position to its displaced position by pivotal movement of the upper post member and the bar about the axis of articulation.

14. A tailgate assembly according to claim 13 further including a catch device proximate the axis of articulation operative to releasably maintain the upper post member in selected positions of rotation relative to the lower post member.

15. A tailgate assembly according to claim 14 wherein the catch device includes a circumferentially spaced series of catch holes centered on the axis of articulation for selective coaction with a catch pin.

* * * * *